US008046296B2

(12) United States Patent
Brams et al.

(10) Patent No.: US 8,046,296 B2
(45) Date of Patent: Oct. 25, 2011

(54) SYSTEM FOR VALUING AND TRANSFERRING INTERESTS IN PROPERTY OR OTHER GOODS

(76) Inventors: Steven J. Brams, New York City, NY (US); James F. Ring, Providence, RI (US)

( * ) Notice: Subject to any disclaimer, the term of this patent is extended or adjusted under 35 U.S.C. 154(b) by 0 days.

(21) Appl. No.: 12/229,796

(22) Filed: Aug. 26, 2008

(65) Prior Publication Data
US 2009/0076944 A1    Mar. 19, 2009

Related U.S. Application Data

(60) Provisional application No. 60/966,257, filed on Aug. 27, 2007.

(51) Int. Cl.
*G06Q 40/00* (2006.01)
(52) U.S. Cl. ............................ 705/37; 705/39
(58) Field of Classification Search ............ 705/37
See application file for complete search history.

(56) References Cited

U.S. PATENT DOCUMENTS

| | | | | |
|---|---|---|---|---|
| 3,573,747 | A * | 4/1971 | Adams et al. | 705/37 |
| 3,581,072 | A * | 5/1971 | Nymeyer | 705/37 |
| 5,077,665 | A * | 12/1991 | Silverman et al. | 705/37 |
| 5,983,205 | A * | 11/1999 | Brams et al. | 705/37 |
| 6,112,189 | A * | 8/2000 | Rickard et al. | 705/36 R |
| 6,131,087 | A * | 10/2000 | Luke et al. | 705/26 |
| 6,606,607 | B1 * | 8/2003 | Martin et al. | 705/37 |
| 2001/0047323 | A1 * | 11/2001 | Schmidt | 705/37 |

OTHER PUBLICATIONS

Schelling, Thomas (1960). The Strategy of Conflict; Harvard University, pp. 2-50.*
Rubin, Jeffrey (1975). The Social Psychology of Bargaining and Negotiation; Acadmeic Press, pp. 3-30.*

* cited by examiner

*Primary Examiner* — Thomas Dixon
*Assistant Examiner* — Benjamin S Fields

(57) ABSTRACT

The invention that is the subject of this Disclosure is a computerized method for valuing and transferring interests in property (whether real or personal, tangible or intangible) or goods. The method involves having parties that hold ownership interests in property or goods disclose to a processor that is administered by a third-party (but not disclose to each other) a price at which they would be willing to either sell their interests to the other side, or buy out the other side's interests, submitting binding offers to the third party obliging them either to buy or sell at their stated price (in the unlikely event that the stated prices are the same), or, alternatively, at some other price in between the ones set forth in their offers that is more favorable to each of them and that is identified by the third party. The processor then makes a binding determination as to who shall buy, and who shall sell, and makes a binding determination as to the sale price, by following certain protocols and applying a formula, agreed to by the parties in advance, with respect to the numerical values submitted by the respective parties. The invention allows each party to always arrive at an agreed upon outcome, and allows each party always to arrive at an outcome that is either equal to or more favorable to that party than the outcome that that party proposed.

8 Claims, 3 Drawing Sheets

A STEP DIAGRAM OF THE METHOD DESCRIBED IN CLAIM 34

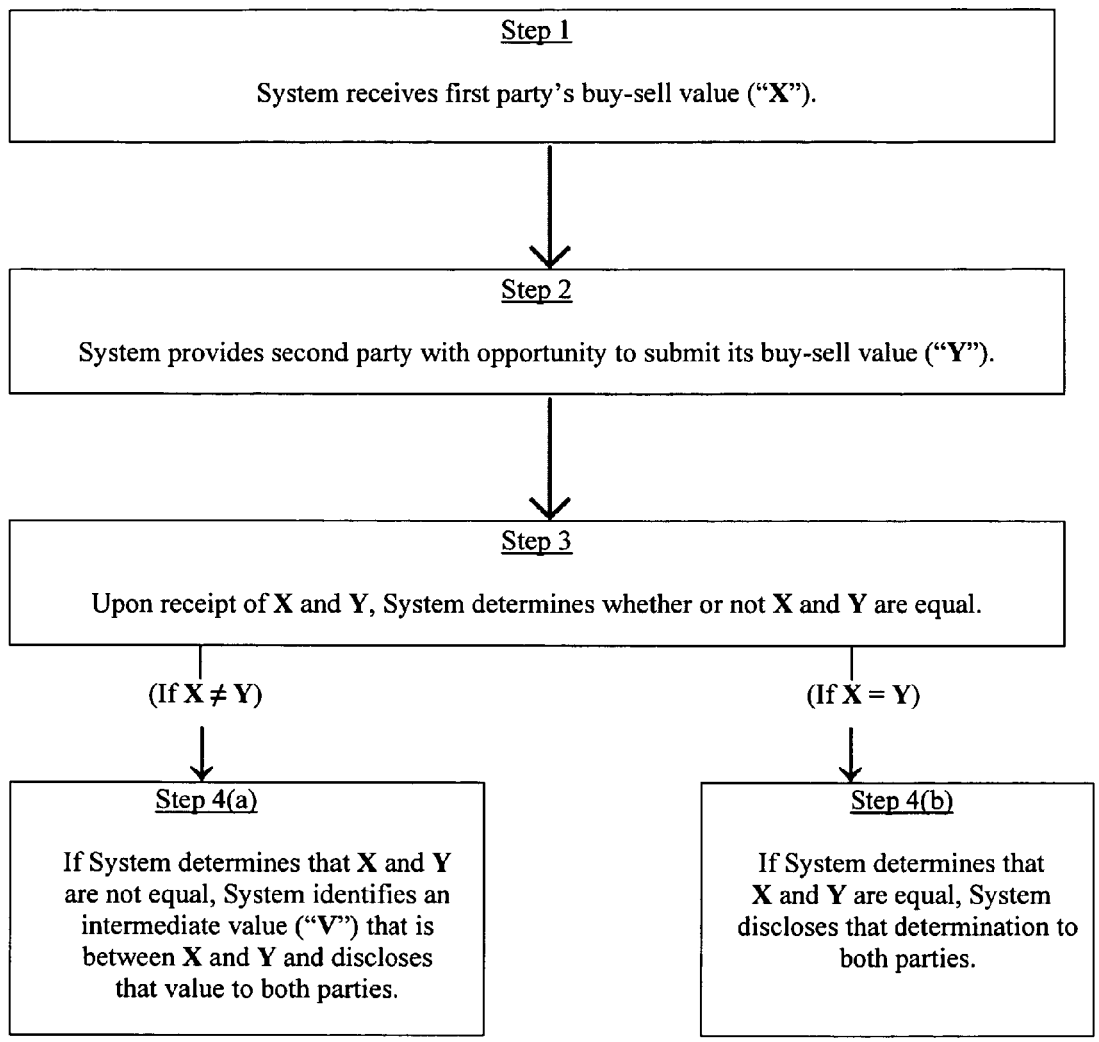
FIGURE 1: A STEP DIAGRAM OF THE METHOD DESCRIBED IN CLAIM 34

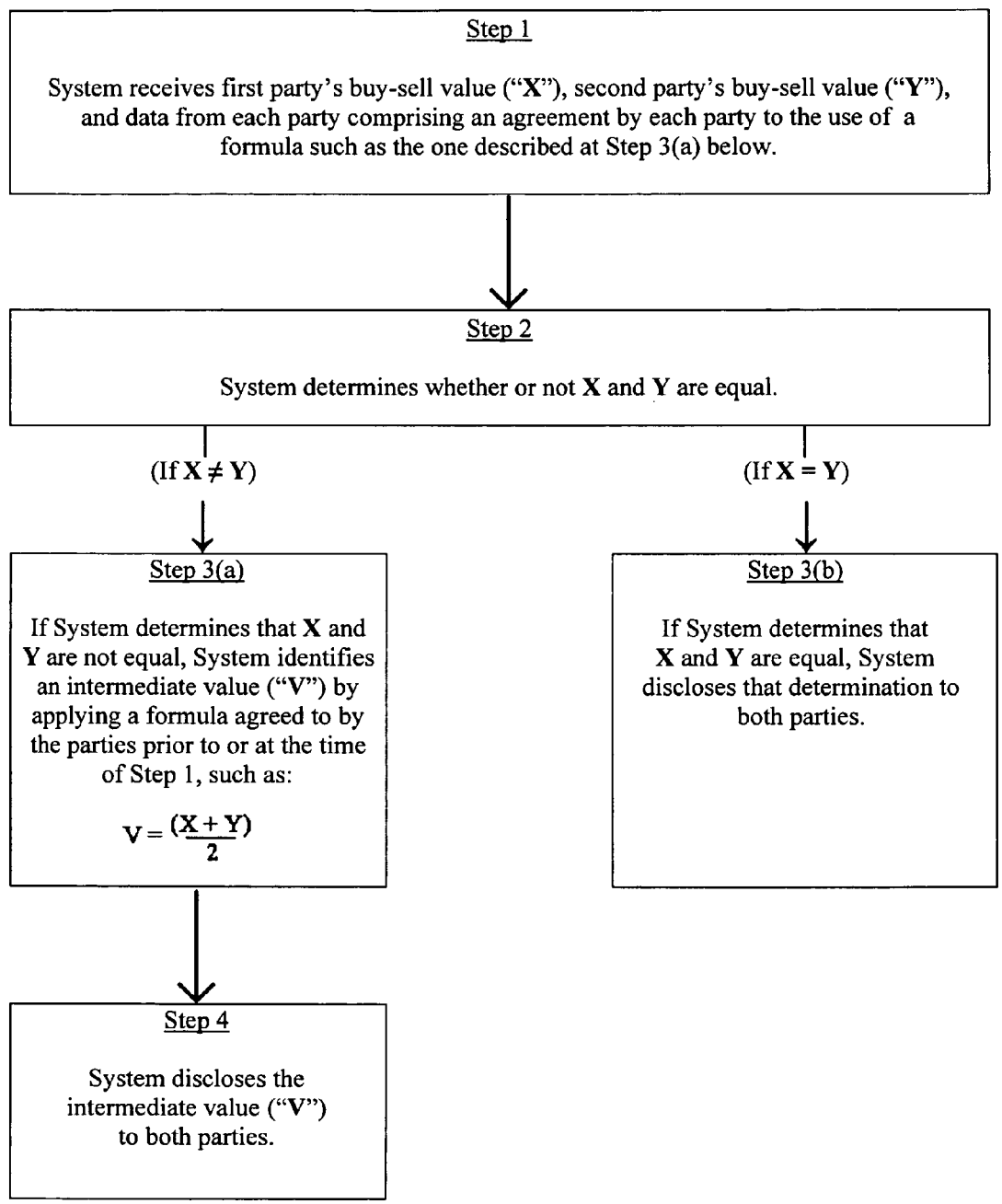
FIGURE 2: A STEP DIAGRAM OF THE METHOD DESCRIBED IN CLAIM 36

FIGURE 3: A STEP DIAGRAM OF THE METHOD DESCRIBED IN CLAIM 38
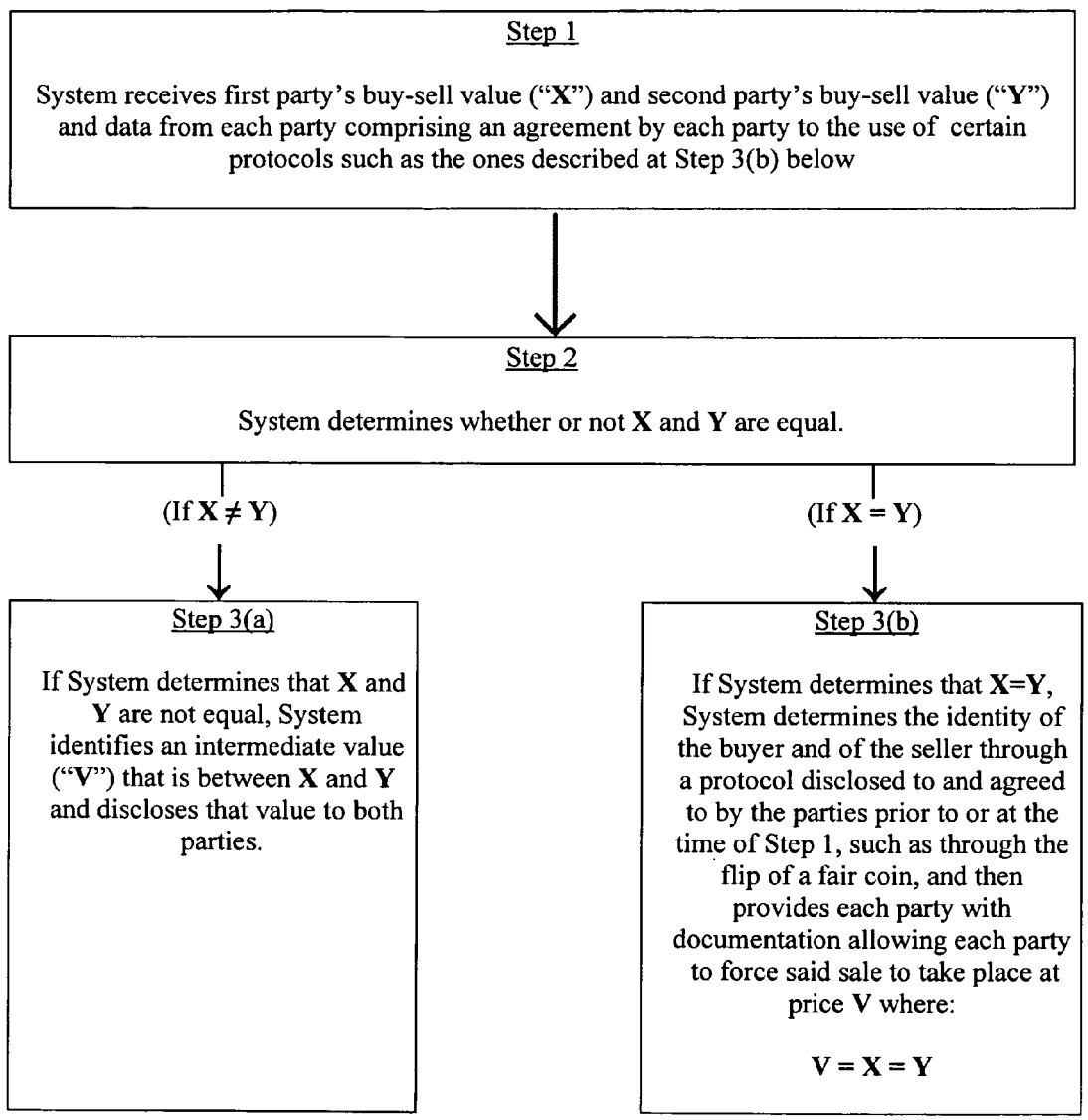

SYSTEM FOR VALUING AND TRANSFERRING INTERESTS IN PROPERTY OR OTHER GOODS

CROSS REFERENCE TO RELATED APPLICATIONS

This application claims priority to U.S. provisional patent application No. 60/966,257, filed Aug. 27, 2007 by the present inventors, the entire disclosure of which is incorporated herein by reference.

STATEMENT REGARDING FEDERALLY FUNDED RESEARCH OR DEVELOPMENT (Not Applicable.)

REFERENCE TO A SEQUENCE LISTING (Not Applicable.)

BACKGROUND OF THE INVENTION

(1) Field of the Invention

The present invention is concerned generally with the field of bargaining and specifically with enhancing the ability of parties to (a) arrive at valuations of property (whether real property or personal property, and whether tangible property or intangible property), and (b) facilitate the transfer of interests in property on terms that are fair and acceptable to the involved parties. It has particular application and utility in situations where a party or group of parties that own an interest in property in common with another party or group of parties wishes to terminate the joint-ownership relationship through a purchase or sale of the ownership interest held by one party (or group of parties) to the other party (or group of parties). It also has specific application and utility in situations where two parties (or groups of parties) that own or hold interests in separate properties are each willing to either buy out the other's interests, or sell their own interests to the other party, under certain terms and conditions (such as when each party recognizes that single ownership would result in a higher valuation).

The invention involves the use of an escrow system and also involves the use of certain processes that are employed in so-called buy-sell mechanisms, under which one party unilaterally "names a price for her share of the [property] and another party decides whether to pay that price (i.e., buy out the first party) or to be paid that price (i.e., sell out to the first party)." Brooks, R., and Spier, K. E., "Trigger Happy or Gun Shy? Dissolving Common-Value Partnerships with Texas Shootouts," Kellogg School of Management, Preprint (2004), at p. 2. Under such arrangements, the first party sets a price and contractually binds herself to abide by the other party's election either to purchase or sell at that price.

Thus, the operational and functional aspects of the invention will be most readily appreciated and understood by parties who are experienced in the use and provision of escrow services and in providing assistance to parties who are seeking to extricate themselves from joint-ownership relationships, such as attorneys. The principles that underlie the invention will be most readily appreciated and understood by game theorists, economists, and strategic analysts.

(2) Background Art

(I) GENERAL DESCRIPTION OF THE UNDERLYING PROBLEM

When joint owners of property (such as real estate, a partnership, or a closely held corporation) are engaged in a dispute, or when their relationship has in some other respect become dysfunctional, it will often be in the best interests of both parties to sell the property to a third party, with the former owners then going their separate ways after splitting the proceeds in accordance with their percentage ownership interests in the underlying property. (In cases where either party has a claim against the other with respect to the extent of those interests or the circumstances that led to the sale, some portion of the proceeds of the sale may be held by a neutral party pending a resolution of those claims, as is done in court-ordered dissolution proceedings, so that the jointly owned property will not be held hostage to the outcome of the dispute.) However, in many instances a sale to a third party is not a viable option, either because there is no valid, external market for the property (as would be the case whenever each of the common owners values the property much more highly than would a third party) or because there is some contractual relationship between the parties that effectively defines a buy-out of one by the other as the only permissible option.[1]

[1] See, e.g., Brooks and Spier, at page 2 ("This paper is concerned with the dissolution of common ownership agreements—such as closely held corporations, partnerships, and limited-liability companies—where the external market for ownership interests is thin. The absence of efficient ownership markets implies that dissolution effectively leads to a private auction among the members of the venture. There are numerous ways of conducting this auction, as well as meaningful alternatives to an auction (e.g., negotiation, mediation, or liquidation), but we focus on a particular auctioning device known as a Texas Shootout. A Texas Shootout—so labeled because once initiated (or triggered) only one party will be 'left standing'—is a buy-sell provision where a party names a price for her share of the venture and another party decides whether to pay that price (i.e., buy out the first party) or to be paid that price (i.e., sell out to the first party)." (Footnotes omitted.)

A party that is effectively compelled either to buy out or sell out to its partner in order to extricate itself from such a relationship faces certain problems that have been touched upon in game theoretic and strategic studies. More specifically, each party would want to sell its interest to the other party if the other party valued the property more highly than it did, and each party would, conversely, want to buy out the other party's interest if the other party's valuation of the property was lower than its own. But neither party will have any knowledge of the other party's valuation unless and until the other party proposes a sale of its interest for a given price, or a purchase of the other's interest for a given price.[2] Neither party may want to propose a price because each party will be legitimately concerned that, if it does so, this will be prejudicial to its bargaining interests insofar as it may result in a sale involving less favorable terms than the other party might have been willing to grant. Thus, such parties will often find themselves at an effective deadlock.[3]

[2] One highly interesting aspect of the dynamic that takes place between parties that are attempting to extricate themselves from a joint ownership relationship through a purchase or sale of one of the party's interests in the underlying property is that, in contrast to several other forms of bargaining, there is a very powerful incentive not to posture and to, instead, retreat into intransigent silence. This arises out of the fact that if, for example, a party makes an offer to sell its interest for an inflated price, the other party will typically respond by simply "turning the table" and offering to allow its interest to be bought out for exactly the same price. Alternatively, if a party makes an offer to buy the other party's interest for a deflated price, the other party may again respond by "turning the table" and offering to buy the offering party's interest for exactly the same price. In cases where the two parties stand in a fiduciary relationship to one another (as is typically the case between joint owners of property, whether it be a partnership, a closely held corporation, or a marital relationship), a party that refuses to allow the table to be turned may be fairly interpreted as having attempted to profit at the other party's expense, which in turn would clearly constitute a breach of that fiduciary duty. This is the dynamic in which buy-sell mechanisms, as discussed infra at pp. 5-9, have their origin.

[3] In recognition of this fact, game-theoretic analyses of buy-sell mechanisms emphasize the efficiency of contractual arrangements dictating their initiation by one of the parties under specified conditions. See, e.g., the articles cited infra at note 4, p. 5.

(II) BUY-SELL MECHANISMS[4]

In dissolution of joint ownership of property contexts, if a party reaches a point where (a) it has arrived at what it considers to be a fair valuation of the property, (b) it is willing to either sell its interests to the other side or, alternatively, buy out the other side's interests at a price based upon that valuation, and (c) it is willing to accept the possibility of the transaction's taking place under terms that are less favorable to it than some other terms that the other side might have been willing to grant, then that party can utilize what is known as a buy-sell mechanism. More specifically, such a party can disclose that valuation to the other side and make a firm offer to either sell its interest at the stated price, or buy the other side's interest at the stated price, at the election of the other side. This, in turn, allows such a party either to break the deadlock or establish that the continuing damage flowing from the deadlock was solely the responsibility of the other side. (Buy-sell proposals are virtually always accompanied by a deadline, because it is understood that a failure by the party that is on the receiving end of the proposal to elect to buy or sell within a given time will further devalue the property, nullifying the valuation reflected in the proposal.)

[4] Buy-sell arrangements are occasionally referred to in economic literature as "cake-cutting" mechanisms, "shotgun" arrangements, or "Texas shootouts." Game-theoretic analyses of such buy-sell arrangements may be found within articles such as Brooks, R., and Spier, K. E., "Trigger Happy or Gun Shy? Dissolving Common-Value Partnerships with Texas Shootouts," Kellogg School of Management, Preprint (2004); Kittsteiner, T. & De Frutos, M. A., "Efficient Partnership Dissolution Under Buy-Sell Clauses," *Econometric Society* 2004 Latin American Meetings, 314 *Econometric Society* (2004); Cramton, P., Gibbons, R. and Klemperer, P., "Dissolving a Partnership Efficiently," *Econometrica*, Vol. 55, pp. 613-632 (1987).

The power of a buy-sell proposal is intuitively understood. The party that makes the proposal must go through the often difficult process of arriving at an independent valuation, and that party must, in order to protect its own interests, be satisfied that the valuation is fair, because that party may be forced to stand on either side of the transaction. But by going through this process, that party arrives at a position of significant power, because that party is now able effectively to compel its adversary, in order for the adversary to protect its own interests, to go through a similar process: determining whether to buy or sell at the stated amount.[5] The party who proposes the buy-sell price is engaging in conduct that is self-evidently fair but that is, at the same time, profoundly coercive. If the adversary refuses to either buy or sell at the stated price, evidence of this refusal can then be used against the adversary in a multitude of different ways. It will, for example, allow the offering party to justify devoting resources to pursuing litigation against the adversary, to form alliances with third parties who might have otherwise been reluctant to take sides, to sow dissension or equivocation among the adversary's allies, and to establish at the end of the controversy that all diminution in value that took place after the tendering of the buy-sell offer was directly attributable to self-destructive and irrational conduct on the part of the adversary.

[5] The process that the adversary goes through will vary depending upon whether the adversary's conception of valuation is interdependent (i.e., inextricably intertwined with its understanding of what the other side might ultimately be willing to grant). An adversary whose conception of valuation is not interdependent, and who arrives at an independent valuation, would simply compare its number with the proffered number—any differential between the two numbers would be sufficient in itself to compel it to buy or sell. (Under such circumstances the party that initiated the proposal may wind up selling its interest for a price that is lower than the other party would, at least in theory, have been willing to grant, etc. But the possibility that the initiating party may be leaving some "money on the table" is a matter of indifference to the initiating party—what the initiating party seeks is to bring the matter to an end by obtaining an outcome that it has defined as acceptable.) If the adversary's conception of value is interdependent, then the proffered number will exert a gravitational pull upon the adversary, because the structure of the system is such that there is no rational basis for supposing that the number is "postured." The proffered number effectively satisfies the classical definition of value: it constitutes a number at which a buyer and a seller are willing to carry out the exchange. Thus, such an adversary could rationally elect to either buy or sell at that number, but could not rationally elect to ignore it. Such a party is compelled by self-interest to either buy or sell at that number prior to the deadline.

The efficacy of buy-sell arrangements is evident from the fact that they have been praised by real-world practitioners as "the ultimate mechanism for resolving disputes,"[6] and by the fact that, according to some commentators, an attorney's failure to put his client in a position to utilize such an arrangement "is considered 'malpractice' among legal scholars and practitioners."[7] Buy-sell arrangements thus serve as an example of an arrangement whereby one party can engage in effective, unilateral, coercive action without running afoul of the rules imposed by a sovereign power, and without having to seek or secure the consent of the other side or the assistance of a court.

[6] See, in this regard, Kittsteiner and De Frutos at note 2, p. 1, quoting from the *Guide to US Real Estate Investing*, issued by the Association of Foreign Investors in Real Estate. It should be noted, however, that buy-sell mechanisms can be fairly viewed, first and foremost, as not being dispute-resolution mechanisms at all but rather as measuring instruments that allow the initiating party to measure the capacity of its adversary to be reasonable by putting the adversary in a position where it has no rational incentive not to be reasonable. Dispute resolution is produced as a by-product.

[7] Quoting from Brooks and Spier at note 6, p. 3.

(III) THE PROBLEM WITH BUY-SELL MECHANISMS THAT IS ADDRESSED BY THE INVENTION

Notwithstanding the benefits that can be obtained by initiating the use of a buy-sell mechanism, many parties are reluctant to do so because they are troubled by the prospect of giving their adversary what might be interpreted as a "windfall." More specifically, if their adversary values the company differently from the valuation set forth in the initiating party's proposal, then the difference between those two numbers may be fairly interpreted as representing a "surplus" that the non-initiating party could capture by simply electing to buy (if the initiating party's valuation was lower than its own) or to sell (if the initiating party's valuation was higher than its own).

In recognition of the fact that the involved parties might both be reluctant to initiate the use of a buy-sell mechanism, attorneys will often recommend that parties who are entering into a joint venture or joint ownership relationship agree, in advance, that one of the parties must initiate the use of a buy-sell mechanism under certain circumstances, such as when the parties have arrived at a deadlock over how to manage or use the property, or such as when one party wishes to bring the joint ownership relationship to an end.[8]

[8] See generally, in this regard, Brooks and Spier, at p. 4. Game-theoretic studies have also considered attempting to address the problem by having the parties agree to an arrangement whereby each party would "bid" for the right to be on one side, or the other, of the buy-sell proposal. See, in this regard, T. & De Frutos, M. A., "Efficient Partnership Dissolution Under Buy-Sell Clauses," *Econometric Society* 2004 Latin American Meetings, 314 *Econometric Society* (2004).

However, even where such contractual arrangements are in place, the reluctance of parties to initiate the use of a buy-sell mechanism due to the prospect that this might allow the initiating party's adversary to capture a surplus often gives rise to litigation. See, e.g., Kittsteiner, T. & De Frutos, M. A., "Efficient Partnership Dissolution Under Buy-Sell Clauses," *Econometric Society* 2004 Latin American Meetings, 314 *Econometric Society* (2004), at pp. 2-3.

III (a) The Problem as it Arises in the Fiduciary Context.

The reluctance to initiate the use of buy-sell mechanisms due to a fear of losing surplus can also create distress in situations where one of the involved parties owes a fiduciary or similar duty to a third party to consummate the transaction on reasonable terms, such as where one of the two parties involved in the initiation or potential initiation of a buy-sell mechanism is a trustee, partner, or corporate officer, acting for the benefit of others who are not directly involved in the negotiations. A party in such a situation faces the prospect that if it fails to initiate the use of a buy-sell mechanism, it may fail to extricate itself and those to whom it owes a fiduciary duty from a detrimental relationship, but that if it initiates the use of a buy-sell mechanism it may face a claim by those to whom it owes a fiduciary duty that it improperly gave up surplus value within the context of the transaction.

III (b) General Comment on the Public Interest.

The reluctance of parties to initiate the use of buy-sell mechanisms is detrimental to the public interest because it interferes with the ability of parties to extricate themselves from relationships under terms that are acceptable to both sides and prevents property from being paired with parties who, from an objective standpoint, value that property more highly. These inefficiencies may also lead to attempts by one of the involved parties to bring the relationship to an end through some means other than a voluntary agreement with the other side, such as through litigation. This phenomenon is, accordingly, adverse to the public interest, as well as adverse to the interests of the parties themselves.

OBJECTS OF THE INVENTION

The objects of the invention may be briefly summarized as follows:
i) To allow a party that wishes to bring a joint ownership relationship to an end to do so on terms that are fair and reasonable from the perspective of all the involved parties.
ii) To allow a party that has arrived at a valuation of jointly owned property and that is willing to either buy or sell its interest in that property based upon that valuation to make a firm proposal to do so without facing the prospect that, if the party to whom the proposal is made has a different valuation, then the party making the valuation will give up all of the differential between the two valuations.
iii) To allow joint owners that are involved in a dispute, deadlock, or other difficult relationship to arrive at a price at which one party may buy out the other for a price that reflects the valuation placed on the jointly owned property by each side.
iv) To provide parties that are contemplating a transaction with an incentive to reflect on and come to a reasoned decision in their own minds as to what might constitute an acceptable valuation or outcome of the transaction.
v) To provide a party that lacks confidence in its own ability to negotiate, or that lacks confidence in the capacity of the other side to negotiate in good faith, with an opportunity to seek and obtain a result that is fair and equitable from the perspective of both sides.
vi) To provide two parties who own property, whether jointly or separately, with a system or method for ensuring that said property is owned by the party that values it more highly.
vii) To provide a system or method allowing parties utilizing the method or methods described in U.S. Pat. No. 5,983,205 to arrive at a mutually acceptable agreement on the issues, property, or goods. For example, this system could be applied to the issue, property, or good on which, under adjusted winner (AW), there is an "equitability adjustment." Thus, instead of this issue, property, or good being divided according to the equitability-adjustment formula under AW, this system would be used to determine (i) the 'winner' of that issue, property, or good, and (ii) the price that the winner would have to pay the loser for winning on said issue, property, or good. This modified version of AW would not satisfy the same properties that AW does, but it could facilitate the equitability adjustment under AW, particularly if the issue, property, or good to be divided under AW is not divisible. (See generally, with regard to AW, Steven J. Brams and Alan D. Taylor, *Fair Division: From Cake-Cutting to Dispute Resolution* (New York: Cambridge University Press, 1996), chpts. 4-5, and Steven J. Brams and Alan D. Taylor, *The Win-Win Solution: Guaranteeing Fair Shares to Everybody* (New York: W. W. Norton, 1999), chpts. 5-9 (each of which is incorporated herein by reference in its entirety). See also, in this regard, the URL http://www.nyu.edu/projects/adjustedwinner.)

(Further objects and advantages will become apparent from a consideration of this Disclosure and the ensuing description).

BRIEF SUMMARY OF THE INVENTION

The invention that is the subject of this Disclosure involves the use of some of the steps involved in a conventional buy-sell arrangement. However, it does not combine those steps with certain additional steps that are utilized in conventional buy-sell arrangements but, instead, combines those steps with a combination of steps that is not utilized in conventional buy-sell arrangements, resulting in a new combination.

Unlike conventional buy-sell arrangements, the steps that are employed in the method described herein do not include having one party (a first party) disclose to the other party (a second party), at the outset of the process, a price at which the first party would be willing either to sell its interest in certain jointly owned property to the second party, or, alternatively, buy out the second party's interest in that jointly owned property. Instead, the first party discloses a numerical value to a third party that is trusted by both sides (such as a party that provides escrow services), at which the first party would be willing to sell an interest that it holds in certain specified property to a second party (which property may or may not be jointly owned with the second party) or, alternatively, to buy an interest held by the second party in certain specified property (which property may or may not be jointly owned).

In further contrast to conventional buy-sell arrangements, the steps that are employed in the method described herein involve having the third party provide the second party with an opportunity to submit a numerical value at which the second party would be willing either to buy or sell the interests in question. Upon receiving such numerical values from both parties, the third party would then compare those numerical values and, if they were not equal, identify an intermediate numerical value, i.e., a numerical value that was greater than what one party proposed, and less than what the other party proposed. The third party would then disclose that intermediate numerical value to both parties. That intermediate numerical value may then be used as a price at which the party that submitted the higher numerical value could buy the interest of the party that submitted the lower numerical value, in which event each party would succeed in either purchasing or selling at a price that is more favorable to that party than the price at which that party was willing to carry out the exchange. In the unlikely event that the numerical values submitted by the parties were equal, the third party would disclose that fact to each party and thereby provide each party with a numerical value that each party was willing to accept either as a buyer or as a seller.

Prior to or at the time that they submit their numerical values to the third party, the parties may bind themselves to an arrangement under which (a) if the numerical values that are submitted are not equal, then the third party will determine an intermediate numerical value through the application of a formula agreed to by the parties in advance, and (b) the party that submitted the higher numerical value shall be deemed to be the buyer, and the party that submitted the lower numerical value shall be deemed to be the seller, with the intermediate numerical value constituting the sale price. The parties may also bind themselves to an arrangement under which, if the numerical values submitted by the parties are equal, then the third party will disclose that numerical value to both parties and the sale will take place at that price, with the identity of the buyer under these circumstances being agreed to in advance or, in the absence an agreement by the parties, determined by the third party by following certain protocols agreed to in advance. Thus, for example, the parties could agree to have the third party make that determination through the flip of a fair coin.[9]

[9] It will be observed that, in traditional buy-sell arrangements, the arrangement resembles the classic method for dividing a cake, whereby one person—say, Ann—cuts a cake and the other person—say, Bob—chooses a piece. Ann must divide the cake 50-50 in terms of her preferences to ensure that, whatever piece Bob chooses, she gets a 50% share. On the other hand, Bob, if his preferences are different from Anns, will think one piece is bigger than the other and so will choose this piece, getting a bonus (i.e., more than 50%) from being the chooser. If Ann makes the initial offer under a traditional buy-sell arrangement, she is in the position of the cutter, because she must make an offer that makes her indifferent between whichever option—buying or selling—Bob chooses. Thus, Ann will be reluctant to initiate the use of a traditional buy-sell mechanism, with the result that both Ann and Bob will remain at a deadlock over the issue of how to cut the cake. By contrast, the current invention provides a method whereby this deadlock can be broken by placing the parties in a position where, instead of Bob getting all of the bonus, the bonus will be shared. As long as the price is intermediate between the two offers, Ann and Bob both benefit—each gets more than the value that each attaches to his or her share. More specifically, if Ann is the buyer, she benefits from not having to pay as much as she offered, and Bob benefits from selling at a price that is higher than that which he offered. See generally, with regard to cake-cutting arrangements, Steven J. Brams and Alan D. Taylor, *Fair Division: From Cake-Cutting to Dispute Resolution* (New York: Cambridge University Press, 1996), chpt. 1, and Steven J. Brams and Alan D. Taylor, *The Win-Win Solution: Guaranteeing Fair Shares to Everybody* (New York: W. W. Norton, 1999), chpt. 4 (each of which is incorporated herein by reference in its entirety). For a game-theoretic analysis of various features of the current invention, see Stergios Athanassoglou, Steven J. Brams, and Jay Sethuraman, *Minimizing Regret when Dissolving a Partnership* (Working Paper, August 2008), a copy of which is currently available at http://politics.as.nyu.edu/object/stevenbrams.html.

It will be appreciated that if, prior to or at the time that the first party submits its numerical value to the third party, the first party binds itself to an arrangement as described in the preceding paragraph and provides the second party with an opportunity to bind itself to such an arrangement as well, then the first party will receive something of significant value even if the second party declines that opportunity. Under such circumstances, the first party will be in a position similar to the position that it would be in if it had disclosed its numerical value to the second party under a traditional buy-sell arrangement, and the second party had then refused to either buy or sell at the first party's stated price. For example, under those circumstances the first party will be able to establish that the second party had effectively walked away from an opportunity to carry out the exchange for a price that would have been at least as good (if the numerical values were equal) or better (if the numerical values were not equal) than whatever price had been named by the second party at that time. If, within such a context, the first party had bound itself to an arrangement under which the formula for determining an intermediate numerical value would produce the mean of the numerical values submitted by the parties, or a numerical value that was more favorable to the second party than the mean, then the second party's refusal to use that arrangement could be fairly interpreted as constituting or involving an attempt by the second party to capture more than fifty percent of the surplus (i.e., the differential between the two numbers) and thus to profit at the first party's expense, rather than to accept an outcome that was as good or better than an outcome that the second party considered to be fair and reasonable. Thus, if the first party initiates the use of the system in a thoughtful manner, then, even in the event that the second party refuses to respond to that initiation, the first party's use of the invention will, as with the initiation of a traditional buy-sell offer, provide the first party with something meaningful and useful (as more fully described supra at pp. 5-7).

The invention's features and utility may be grasped by considering some examples of how it would work in particular situations:

EXAMPLE I

In this example we consider a simple case wherein two parties each hold a fifty-percent (50%) ownership interest in a given piece of property and wish to bring their joint ownership relationship to an end. The parties could each disclose to a third party a price at which that party would be willing to either sell its interest to the other side, or buy out the other side's interest in the property. The parties could also agree to a formula under which the third party would compare the two numerical values and, if they were not equal, issue a binding determination that the party who submitted the higher price would be the buyer, and a binding determination that the sale price would be the mean of the two numerical values. Under such an arrangement, the parties would always achieve their desired goal of a buyout of one by the other and, except in the unlikely event that each party proposed exactly the same number, each party would always obtain terms that were more favorable to it than the terms that it had proposed. In the unlikely event that each party proposed exactly the same number, each party would obtain terms that were no better than, but also no worse than, the terms that it had proposed, and the identity of who would be the seller and who would be the buyer could, by prior agreement between the parties, be determined by an agreement between the parties at that time or, if they were unable to agree, by the third party via the flip of a fair coin or some other process agreed to in advance. The chart below illustrates the outcome that would be achieved in this situation under various conditions where the parties did not submit equal numbers:

| First Party's Proposed Buy-Sell Price | Second Party's Proposed Buy-Sell Price | Identity of Buyer as Determined by Third Party | Sale Price as Determined by Third Party under Agreed-Upon Formula |
|---|---|---|---|
| $150,000 | $200,000 | Second Party | $175,000 |
| $150,000 | $100,000 | First Party | $125,000 |
| $200,000 | $100,000 | First Party | $150,000 |
| $100,000 | $200,000 | Second party | $150,000 |

EXAMPLE II

In this example we consider a simple case where two parties each hold stock in a closely held corporation. Assume (a) that the company has issued a total of one hundred (100) shares of stock, (b) that the first party owns twenty percent (20%) of that stock, and (c) that the second party owns ten percent (10%). Each party would like either to own thirty percent (30%) of the company or sell their existing stock on reasonable terms and end their relationship with the company. The parties could agree to use the same simple arrangement and formula as used in example 1, except that in this case the term proposed by the parties would consist of a price per share.[10] The following chart depicts the outcome that would be achieved in this situation under various conditions (and uses the approach under which each party would propose a price-per-share):

[10] It will be appreciated that, within such contexts, the parties might, as an alternative to proposing a price per share, each propose a valuation of the total entity, to which their percentage interests could then be applied on a pro-rata basis. Alternatively, each could propose a valuation of the total stock that the buyer would have upon the completion of the transaction (in this example, 30%), to which their percentage contribution to that total could then be applied in the event that they were selected as a seller. This would, for example, allow the parties to take into account issues such as "control premiums," i.e., the concept that a single party's ownership of particular blocks or amounts of stock might give that stock greater value.

| First Party's Proposed Buy-Sell Share Price | Second Party's Proposed Buy-Sell Share Price | Identity of Buyer as Determined by Third Party | Share Price as Determined by Third Party under Agreed-Upon Formula |
| --- | --- | --- | --- |
| $15,000 per share | $20,000 per share | Second Party | $17,500 per share |
| $15,000 per share | $10,000 per share | First Party | $12,500 per share |
| $20,000 per share | $10,000 per share | First Party | $15,000 per share |
| $10,000 per share | $20,000 per share | Second party | $15,000 per share |

EXAMPLE III

In this example we consider a case in which the first party and the second party own similar homes that are adjacent to one another, with each house being situated on a half-acre lot. We assume that a recent change in zoning laws makes it permissible for homeowners in their neighborhood to operate gambling casinos out of their homes, but only if they own at least one acre of land, with the result that the two houses would have much more value under common ownership than under their current ownership. The parties could agree to use the same simple arrangement and formula as used in example 1. The chart below illustrates the outcome that would be achieved in this situation under various conditions where the parties did not submit equal numbers, and would be identical to the chart depicted in example 1, except that here we add a minimal level of complexity and assume that the first party's house is on a corner lot, which would add twenty thousand dollars ($20,000) in value to his property, whether sold separately or sold jointly with the second party's to a third party. In order to address this complexity, the parties could agree that, in the event that second party was determined to be the buyer, then the formula would consist of adding the two numbers together, dividing the total by two, and then adding twenty thousand dollars ($20,000) to the product of that division, with that total becoming the sale price. The following chart depicts the outcome that would be achieved in this situation under various conditions:

| First Party's Proposed Buy-Sell Price | Second Party's Proposed Buy-Sell Price | Identity of Buyer as Determined by Third Party | Sale Price as Determined by Third Party under Agreed-Upon Formula |
| --- | --- | --- | --- |
| $150,000 | $200,000 | Second Party | $175,000 + $20,000 |
| $200,000 | $100,000 | First Party | $150,000 |
| $100,000 | $200,000 | Second party | $150,000 + $20,000 |
| $150,000 | $160,000 | Second Party | $155,000 + $20,000 |
| $160,000 | $150,000 | First Party | $155,000 |

BRIEF DESCRIPTION OF THE SEVERAL VIEWS OF THE DRAWING(S)

The following figures have been submitted together herewith:

FIG. 1: A Step Diagram of the Method Described in claim 34 (one page).
FIG. 2: A Step Diagram of the Method Described in claim 36 (one page).
FIG. 3: A Step Diagram of the Method Described in claim 38 (one page).

DETAILED DESCRIPTION OF THE INVENTION (1) Introduction

The invention that is the subject of this Disclosure involves, as a preliminary matter, the use of certain conventional steps that are commonly utilized in escrow arrangements.[11] Under such conventional and traditional arrangements, a party (the first party) places something that is of value (the escrow) into the hands of a neutral party (the escrow agent), and expressly authorizes the escrow agent, in a contractual undertaking between the first party and the escrow agent (the escrow contract), to release the escrow into the hands of a second party (the second party) if, within a period of time specified by the first party (the escrow period), certain conditions specified within the escrow contract are satisfied. The conditions are fixed conditions in the sense that they cannot be withdrawn or altered during the escrow period. During the escrow period, the second party is provided with an opportunity to make a presentation of data that would satisfy all of those fixed conditions or establish that all of those fixed conditions have been satisfied (a presentation).

[11] Escrow: "A deed, bond or other written engagement, delivered to a third person, to be delivered by him to the grantee only upon the performance or fulfillment of some condition. The deposit of the escrow places it beyond the control of the grantor; but no title passes until the fulfillment of the condition." Webster's New Collegiate Dictionary, 2nd Ed. Escrow arrangements are typically utilized in situations where at least one of the parties to a contemplated transaction lacks trust in the other party's good faith or willingness or ability to perform, with the result that a neutral third person or entity is employed to secure the interests of each party. Persons and entities engaged in the business of providing certain forms of escrow services are subject to governmental regulations (see, e.g., 10 California Code of Regulations §1700, et seq.) and represented by various trade associations, such as the American Escrow Association (http://www.a-e-a.org/) and the California Escrow Association (http://www.ceaescrow.org/).

In the event that the fixed conditions have not been satisfied by the end of the escrow period, the escrow contract obliges the escrow agent to return the original escrow to the first party. In the event that all of the fixed conditions have been satisfied, then that fact is disclosed to each of the parties, resulting in an exchange of the consideration that each was seeking. The arrangement between the parties is such that the first party will have a cause of action against the escrow agent if the escrow agent fails to meet its obligations, and the second party will have a cause of action against the first party and, potentially, the escrow agent if the second party satisfies the fixed conditions but the escrow is not released.

By way of introduction to the material that follows, it should be noted that the terms used in this section and within the ensuing claims have the same meaning as is given to those terms within the balance of this Disclosure. Furthermore, and as a definitional matter, it should be noted that that there is no substantive difference between a presentation that "satisfies" a fixed condition and a presentation which "establishes" the satisfaction of that fixed condition, as those terms are used from time to time within this Disclosure. The use of such alternative language within this Disclosure is intended simply to address the fact that, depending upon the manner in which the fixed conditions have been defined in the data submitted by the first party, it may be more accurate from a semantic perspective to characterize the submission of a specific presentation as constituting, itself, the satisfaction of the fixed conditions (i.e., the "performance or fulfillment of some condition," as referred to within the definition of escrow appearing in note 11 at page 18, supra), or it may be more accurate from a semantic perspective to refer to that same presentation as having established that the condition has been satisfied (i.e., that the "performance or fulfillment of some condition" has taken place). For example, if the data submitted by the first party defines, as a fixed condition for a release of the escrow, the submission of a certified copy of a board-of-directors vote assenting to a purchase or sale of a given asset at specified price, then a presentation that includes such a certified copy will, itself, constitute the satisfaction of that condition. Alternatively, if the data provided by the first party instead simply defines the occurrence of that vote as a fixed condition for a release of the escrow, then the submission of a certified copy of the vote would more properly be characterized as "establishing" that the fixed condition has been satisfied.

It should also be noted, as a preliminary matter, that the ability of the parties to use the system will be substantially enhanced if the system has been configured in a manner so that each party is able to utilize it with ease and with confidence. As is noted in the discussion of specific aspects of the system set forth below, the ability of the parties to use it with ease and confidence will be enhanced through a computerized, on-line embodiment, and such an embodiment is thus preferable from the perspective of all parties.[12] However, it should be noted that, although the preferred embodiment of the invention that is the subject of this application consists of a computerized, on-line embodiment, this application does not constitute an attempt simply to patent a computerized or on-line version of a pre-existing, historical method of conducting escrow or buy-sell transactions. To the contrary, the method or system that is described within this Disclosure is, to the best of the inventors' knowledge and belief, entirely novel and without historical precedent.

[12] A computerized, on-line embodiment of a version of the invention that is the subject of this application, illustrating various features of the invention as described in this section of the application, may currently be accessed at https://www.fairoutcomes.com/run_fbs/home.pl.

(2) Description of the System Administrator

The system is capable of engaging in escrow transactions because it is administered and operated by a person or entity (the system administrator) that is legally distinct from the parties utilizing the system. As with traditional escrow agents, such as bankers and lawyers who provide escrow services in the ordinary course of their business, the system administrator is preferably neutral, and his obligations to the parties are limited to obligations that he elects to undertake, either through simple contracts with, or through representations made to, those parties. In order for the system administrator to be effective and enjoy the trust of parties utilizing the system, the system administrator preferably needs to be able to satisfy the expectations that parties generally have when they utilize a lawyer or banker as an escrow agent in more traditional escrow transactions. These expectations include an ability to recognize and disclose any potential conflicts of interest, to hold information in strict confidence, to hold documents and data in secure locations, to ensure that the conditions for a release of the escrow are set forth without ambiguity, to make accurate determinations as to whether the conditions for a release of the escrow have been met, and to engage in secure transactions. For this reason, the system will in many instances perform best if it is administered by an entity such as a law firm or bank that already provides escrow services.

(3) Description of the Escrow

The escrow deposited by the first party consists of (a) a binding offer to sell or transfer its interests in certain specified property to a second party at a price announced by the system administrator provided that said price is greater than or equal to a numerical value specified by the first party within that offer; and (b) a binding offer to buy out or acquire the second party's interests in certain specified property at a price announced by the system administrator provided that said price is less than or equal to that same specified numerical value. (In cases where one party's ownership interest is greater than the other, such as when one party owns 20% of a company's shares and the other party owns 30% of that company's shares, the price may be stated in terms of units of ownership, e.g., the offers would consist of an offer to buy or sell at a specified price per share.)

(4) Description of the Initial Delivery of the Escrow

The escrow is, by definition, and as noted in the definition set forth supra at note 9 on page 10, "delivered to a third person, to be delivered by him to the grantee only upon the performance or fulfillment of some condition. The deposit of the escrow places it beyond the control of the grantor; but no title passes until the fulfillment of the condition." The escrow is thus initially delivered by the first party (i.e., the "grantor," as referred to in above-quoted definition) to a person or entity that is a "third person" (i.e., someone other than the grantor or the grantee). (The second party will in most instances be the grantee, i.e., the person or entity to whom the escrow would be delivered upon a determination that all of the fixed conditions had been satisfied, but there are many instances in which the second party will be someone other than the grantee who is seeking to cause the escrow to be released to the grantee, either to further the interests of the grantee or, by virtue of some relationship that the second party has with the grantee or the escrow itself, to further the second party's own interests.) The third person to whom the escrow is delivered is, by definition, the escrow agent. It is generally preferable to have the system administrator serve as the escrow agent to simplify the arrangement. However, there is no inherent requirement that the system administrator serve as the escrow agent. For example, in many instances the nature of the relationship between the parties, or the nature of the contemplated transaction or of the escrow itself, will be such that a person or entity other than the system administrator may more effectively perform the role of the escrow agent.

The physical delivery of the escrow to the escrow agent may take place by mail or courier service, or it may be accomplished via transmission over a global communication service, such as via facsimile transmission. However, the manner of delivery should not compromise the binding nature of the escrow. Thus, for example, where the escrow has been signed by the first party but deposited via facsimile transmission, the first party would want to include within the contractual undertaking a clause to the effect that "a photocopy or facsimile transmission of a signed counterpart of this contractual undertaking shall have the same force and effect as an original."

(5) Description of the Escrow Contract

The original escrow may be held in the same manner in which escrow is routinely held by escrow agents such as law firms and banks. The escrow may be placed in a secure location, beyond the control of the first party. The escrow may be held in accordance with an escrow contract, similar in many respects to the contracts that have traditionally been used by law firms and banks that serve as escrow agents, but containing some unique aspects. (In cases where the system administrator does not serve as the escrow agent, the contractual obligations undertaken by the escrow agent may include an obligation to release the escrow upon a determination by the system that all of the fixed conditions for a release of the escrow had been satisfied. In such cases, the rights and obligations of the first party, the escrow agent, and the system administrator are either set forth in a single contract between all three of those parties, or in a set of contracts between the first party and, on the one hand, the escrow agent and, on the other hand, the system administrator. All such contractual arrangements would fall within the definition of the term "escrow contract," as that term is used within this Disclosure.[13]) In the preferred embodiment of the system, the escrow contract includes the following written material:

[13] It will be appreciated that, within the context of an online embodiment, and as evidenced by the online embodiment referenced supra at page 20, note 12, the contractual terms discussed herein may be readily incorporated into the "Terms of Use" for the online site and into the representations made by each party at the time that it elects to enter data into the online system (i) A general description of the escrow (with copies of any documents comprising the escrow attached to the escrow contract as exhibits and marked as unenforceable copies, and upon which the numerical value specified by the first party will have been redacted).

(ii) An irrevocable assignment from the first party to the escrow agent of control over the escrow for a specified period of time (i.e., the escrow period).

(iii) An irrevocable agreement that, during that escrow period, no changes or modifications will be sought or permitted with respect to the escrow or the escrow contract, including the exhibits to the escrow contract.

(iv) An irrevocable instruction from the first party, directing and authorizing the escrow agent to cause the escrow to be released to a second party identified by the first party within the escrow contract in the event that the system determines that certain conditions specified by the first party and set forth on an exhibit to the escrow contract have been satisfied within the escrow period.

(v) An exhibit, as referred to in the preceding subparagraph, setting forth the conditions for a release of the escrow specified by the first party.

(vi) An exhibit, constituting a format approved by the first party for use by the second party in the event that the second party wishes to make a presentation to the system in an effort to satisfy all of the fixed conditions for release of the escrow or establish that all of said fixed conditions have been satisfied. This exhibit will normally be in a form similar to the escrow itself, consisting of (a) a binding offer by the second party to sell or transfer its interests in certain specified property to the first party at a price announced by the system administrator provided that said price is greater than or equal to a numerical value specified by the second party within that offer; and (b) a binding offer by the second party to buy out the first party's interests in certain specified property at a price announced by the system administrator provided that said price is less than or equal to that same specified numerical value.

(vii) An exhibit setting forth protocols to be followed by the system administrator upon the submission of a presentation by the second party. The protocols would ordinarily provide that, upon the submission of such a presentation, the system administrator would compare the two numerical values to determine whether or not they were equal and then (a) identify an intermediate numerical value by applying a formula set forth in the escrow contract (e.g., the escrow contract may provide that the system administrator should add the two numerical values and then multiply the total by 0.50, with the product of that multiplication then becoming the intermediate numerical value[14]), (b) announce that numerical value as the sale price at which the transaction should take place, with the party that proposed the higher numerical value being the buyer, and the party that proposed the lower numerical value being the seller, and (c) give the party that had offered the higher numerical value the binding offer to sell that had been tendered by its adversary, and give the party that had offered the lower numerical value the binding offer to buy that had been offered by its adversary, allowing each party to legally enforce a sale at the intermediate sale price. The protocols would also ordinarily provide that if, upon comparing the two numerical values, the system administrator determined that they were equal, then the system administrator would announce that numerical value as the sale price at which the transaction should take place and, in the event that parties did not come to an agreement as to who should be the buyer, and who should be the seller, under those circumstances, then the system administrator would make that determination by a random selection process involving a probability of 0.50, such as through the flip of a fair coin or an analogous computerized process.

[14] It will be appreciated that, while most parties would elect to use the above-referenced formula, there would be many situations in which the parties might elect to use a different formula. For example, as discussed supra, at pp. 13-14, there may be instances where the first party may want to propose a formula that could provide the second party with an outcome more favorable than the mean in order to induce the second party to use the system and/or deprive the second party of a rational basis for failing to use it. By way of further example, at the time that parties are entering into a joint venture contract, they may wish to include provisions allowing either party to initiate the use of the system under certain conditions, but they might also wish to provide incentives and disincentives for a party to use it under specific circumstances. They could do so by agreeing to use a formula that did not produce the mean. The use of a different formula might also be appropriate where, for example, the property at issue comprised corporate shares in a single company but where the value of those shares may vary somewhat depending upon which party was the owner, either as a result of differing classes of some of the involved stock or, in cases where there were multiple other shareholders allied with one of the parties, but not with the other, because one party might, as a buyer, be able to utilize the stock in ways that the other could not.

(viii) An irrevocable acknowledgment that the second party is an intended third-party beneficiary of the escrow contract, with the right to bring a cause of action for damages or for specific performance in the event of a breach or failure to perform any of the provisions of the escrow contract with respect to which the second party is identified as an intended beneficiary.

(6) Description of the System's Initial Interaction with a Designated Second Party As was indicated in subparagraph (iv) of the preceding section, the identity of the second party may be set forth by the first party within the escrow contract or by some other similar means. However, the first party may wish to ensure that a person or entity that communicates with the system in the capacity of a second party is in fact the second party designated by the first party. Accordingly, in the preferred embodiment of the system, the system generates and delivers a password for use by the second party, which the first party can then cause to be delivered to the second party in a manner that the first party deems to be secure and appropriate. In addition, if instructed to do so by the first party, the system may require a party utilizing the password to provide additional identifying information, analogous to the additional information that is commonly required to progress through secure websites, such as credit card information. In addition, where the second party is a corporate, political, or other entity, as distinct from an individual, the system may, if instructed to do so by the first party, require an individual utilizing the password to provide evidence of that individual's authority to act on behalf of the second party, such as by providing the system with a certified copy of a vote by a board of directors authorizing the individual to utilize the system on the second party's behalf. In the preferred embodiment of the system, a party that has used the initial password is able to contact the system and obtain general information in the form of written representations from the system with respect to the general manner in which the system operates, its confidential features, and its potential benefits. However, the system does not engage in any substantive interactions with a second party unless and until the second party has provided the required information with respect to identification and authority and capacity to act. In the preferred embodiment of the system, a party that has utilized the initial password and then provided all required additional information with respect to its identity and/or authority and capacity to act is issued a second password, permitting it to reach a level of the system that cannot be reached by a party that has access to the initial password but that fails to satisfy the additional requirements.

(7) Description of the Manner in which the System Provides the Second Party with Information Concerning the Escrow and the Escrow Contract In the preferred embodiment of the system, after the provision of all required information with respect to identification, authority, and capacity to act, the system provides the second party with a copy of the escrow contract, including all of the written material identified in section 5 above. The system thus provides the second party with a general description of the original escrow (including redacted copies of the documents comprising the escrow), a description of the respective rights and obligations of the first party and the system administrator with respect to the escrow (including the fact that the escrow contract and its various exhibits cannot be modified during the escrow period), and a disclosure of the second party's status as an intended beneficiary of the escrow contract with a right to bring a cause of action to enforce its terms. In the preferred embodiment of the system, the second party is also provided with a representation by the system administrator that these descriptions and disclosures are true and accurate, thereby providing the second party with a cause of action against the system administrator in the event that the representation is false and the second party suffers harm as a result of the second party's reasonable reliance upon that representation.

(8) Description of the Manner in which the System Permits the Second Party to Submit Presentations in an Effort to Satisfy the Fixed Conditions for a Release of the Escrow In addition to providing information to the second party with respect to the escrow and the conditions for its release, the material provided to the second party also includes, as was noted above:
An exhibit constituting a format approved by the first party for use by the second party in the event that the second party wishes to make a presentation to the system in an effort to satisfy all of the fixed conditions for release of the escrow or establish that all of said fixed conditions have been satisfied. This exhibit will normally be in a form similar to the escrow itself, consisting of (a) a binding offer by the second party to sell or transfer its interests in certain specified property to the first party at a price announced by the system administrator provided that said price is greater than or equal to a numerical value specified by the second party within that offer; and (b) a binding offer by the second party to buy out the first party's interests in certain specified property at a price announced by the system administrator provided that said price is less than or equal to that same specified numerical value.

Thus, by providing the second party with the exhibit in question, the system permits the second party to submit data into the system in an effort to satisfy all of the fixed conditions.

The method of submission of a presentation by the second party, such as via mail, courier service, facsimile transmission or via e-mail, is set forth within the escrow contract. In the best use of the system, the first party makes the method of submission as convenient as possible for the second party, while at the same time taking steps to ensure that the selected method of submission does not compromise the enforceability of the contractual undertaking set forth in the confidential presentation. For example, the first party may, in order to facilitate a use of the system by the second party, agree to permit the second party to make presentations to the system via entries on a website operated by the system administrator. However, prior to permitting the second party to submit a presentation via entries on a website, the first party may want the system administrator to require the second party to go through a series of protocols on the website, similar to the protocols involved in secure, web-based transactions such as credit-card purchases, or in telephonic banking transactions, so as to confirm that the second party intends to be bound by those entries. In the best use of the system, the system administrator may alert the first party to the various methods by which the deposit of a presentation with respect to a potential transaction may be made convenient for the second party, without compromising the enforceability of the contractual undertaking set forth in the presentation.

(9) Description of the Manner in which the System Compares the Numerical Value Set Forth in the Escrow with the Numerical Value Set Forth in the Second Party's Presentation The comparison of the numerical valuation set forth by the first party with the numerical valuation set forth by the second party, and the application of the formula agreed to by the parties for the purpose of arriving at an intermediate valuation based upon those two numbers, may be performed by the system in any number of ways depending upon the manner in which those numerical valuations have been submitted into the system. In the preferred embodiment of the system, the format that the system provides to the second party for the purpose of submitting that numerical valuation is presented to the second party on a website operated by the system administrator, wherein the second party may be presented with forms similar to the escrow itself, consisting of (a) a binding offer by the second party to sell or transfer its interests in certain specified property to the first party at a price announced by the system administrator provided that said price is greater than or equal to a numerical value specified by the second party within that offer; and (b) a binding offer by the second party to buy out the first party's interests in certain specified property at a price announced by the system administrator provided that said price is less than or equal to that same specified numerical value. (In the preferred embodiment of the system, those forms may appear as a distinct webpage in an immutable format (such as a PDF format) except for the portion of the document where the second party is invited to input data defining said numerical value. In the preferred embodiment of the system, the second party is able to type a numerical term into that space on the webpage, and then to elect to enter that data into the website, at which time the system may call upon the second party to click on a link on that website confirming that the second party understands and agrees to be bound by the data so entered by the second party. If the second party clicks on that confirmatory link, the website simply applies the agreed-upon formula to the numerical values submitted by the respective parties and announces a result on the basis of that application.

(10) Description of a Mode of the System Allowing for the Provision of an Affidavit as to The First Party's Use of the System in the Event that a Release of the Escrow is not Achieved The system may be configured and, in the preferred embodiment of the system, is configured so that, in the event that a release of the escrow has not been achieved by the end of the escrow period, the first party may obtain an affidavit or similar certification from the system administrator, attesting to (a) the general method employed by the system, (b) the first party's use of the system, (c) the precise data inserted by the first party into the system, and (d) the fact that the second party failed or refused to enter data into the system. The issuance of such an affidavit or similar certification allows the first party to establish that the second party had effectively rejected an offer to buy or sell on the basis of the proposal set forth by the first party, and thereby provides the first party with something that may prove to be of significant value to the first party, and that may prove to be substantially detrimental to the second party, such as in cases where one of the parties is acting in a fiduciary capacity (as discussed supra at page 8 of this Disclosure).

(11) Description of a Mode of the System Allowing for the Submission of a Revised Numerical Value or Values Either by Prior or Mutual Agreement Following a Disclosure to the Parties of Information Concerning the Initial Submissions The system may be configured so as to allow the parties, by an agreement entered into by the parties prior to or at the time that they submit their numerical values into the system, to obtain interim information from the system concerning the initial submissions made by the parties and to allow one or both parties to revise their numerical values based upon that information. By way of example, the parties may enter into an agreement along the following lines. The agreement may provide that, following their initial submissions of numerical values, the system would first determine whether or not those values were equal. In the event that they were not equal, the system would then disclose to each party interim information such as (a) the identity of the party that submitted the higher numerical value; or (b) the differential between the two numerical values; or (c) whether or not the differential between the two numerical values was greater than or less than some differential specified by the parties. Depending upon the protocols agreed to by the parties, one or both parties might then be allowed to revise the numerical value that it originally submitted, or one or both parties might then be allowed to revise the numerical value that it had originally submitted provided that neither party objected to such a revision.

(12) Conclusion: Ramifications and Scope of the Invention

It will be appreciated that the system that is the subject of this application provides a highly useable and easy-to-administer system whereby parties can extricate themselves from joint ownership or similar relationships and engage in transfers of interests in jointly or separately owned property under terms that are reasonable and acceptable from the perspective of both sides. A working version of the system could readily be built or made from the information contained herein by any law firm, bank, or other party with experience in the escrow field, and could easily be administered by such parties and used by anyone competent to engage in traditional escrow transactions.

While the foregoing description contains many specifications, they should not be construed as limitations of the scope of the invention but, rather, as an exemplification of one preferred embodiment thereof. Many other variations are possible, such as the use of a telephonic, rather than a web-based, platform for the system, or such as by having the precise manner in which the system may be used stipulated to in a pre-existing agreement between the parties (i.e., an agreement that was entered into by the parties prior to the time at which the circumstances giving rise to the purchase or sale arose, similar to an agreement containing an arbitration provision), or directed by an entity to whose power both parties are subject, such as a sovereign entity, its court system, or an employer. Accordingly, the scope of the invention should be determined not by the embodiments described above but by the appended claims and their legal equivalents.

We claim:

1. A computerized method for valuing and transferring interests in property or other goods, comprising the following steps:
    a) Receiving first information from a first party into a processor wherein first information contains at least in part data identifying property or goods in which first party has an ownership interest and a numerical value corresponding to a price at which first party would be willing to sell or transfer a specified portion of said interest to a second party or, alternatively, at which first party would be willing to buy or acquire a specified portion of said second party's interest in certain specified property or goods;
    b) Treating said numerical value as confidential;
    c) Providing said second party with an opportunity to make a confidential presentation of second information to said processor wherein second information contains at least in part data specifying a numerical value corresponding to a price at which second party would be willing to buy or acquire said specified portion of said first party's interest, or, alternatively, sell or transfer said specified of portion of said second party's interest;
    d) Upon receiving second information prior to said deadline, processing first and second information and determining third information as a function of first and second information wherein third information includes at least in part a determination as to whether the numerical value specified in first information was greater than, equal to, or less than the numerical value specified in second information;
    e) Where third information includes a determination that the numerical value specified in first information is not equal to the numerical value specified in second information, processing first and second information and determining fourth information as a function of first and second information wherein fourth information includes at least in part a determination of an intermediate numerical value corresponding to a price that is between said two values; and f) Where third information includes a determination that the numerical value specified in first information is equal to the numerical value specified in second information, disclosing said determination to first party and to second party;

g) Whereby a party that is willing to either sell or transfer an interest that it holds in certain property to another party for a certain price, or, in the alternative, buy or acquire an interest that the other party holds in certain property for that same price, may, by agreeing to have that price compared with a price at which the other party would be willing to either buy or sell those same interests, and by agreeing that if the prices are not equal then the party that proposed the higher price shall be the buyer, with the price being set at an intermediate numerical value, place itself and the other party in a position where, if the prices are not equal, each party will always succeed in either purchasing or selling at a price that is more favorable to that party than the price at which that party was willing to carry out the exchange.

2. The computerized method described in claim 1, wherein said processor is accessible, and communications between the parties and the processor are conducted, via a global information network, including the interne, the world-wide web, or wireless or non-wireless telecommunication systems.

3. The computerized method described in claim 1, wherein said identification of an intermediate, numerical value between the two numerical values submitted by the parties is made by the processor by applying a formula agreed upon by the parties prior to or at the time that they submitted those numerical values.

4. The computerized method described in claim 1, wherein said identification of an intermediate, numerical value between the two numerical values submitted by the parties is made by the processor by adding those two numerical values together and dividing the total by two, with the resulting product constituting the intermediate value.

5. The computerized method described in claim 1, wherein, in the event that the processor makes a determination that the two numerical values submitted by the parties are equal, disclosing that numerical value as the sale price at which the transaction shall take place and, if the parties are unable to agree upon who shall be the seller and who shall be the buyer, making a determination as to who shall be the seller and who shall be the buyer through a process for making that determination that was agreed upon by the parties prior to or at the time that they submitted those numerical values to the processor, and disclosing that determination to said first party and to said second party.

6. The computerized method described in claim 5, wherein said process for determining who shall be the buyer, and who shall be the seller, consists of a computerized random selection process involving a probability of 0.50, analogous to the flip of a fair coin.

7. The computerized method described in claim 1, wherein said data is received by the processor from said second party at the same time as said data is received from said first party.

8. The computerized method described in claim 1, wherein, in the event that said second party fails to submit said data after being presented said opportunity to do so, the processor will generate and provide the first party with a writing attesting to said failure.

* * * * *